United States Patent
Edelhaus (10) Patent No.: US 9,264,666 B1
(45) Date of Patent: Feb. 16, 2016

(54) LIVE STREAMING USING MULTIPLE CONTENT STREAMS

(71) Applicant: EnVid Technologies LLC, Sharon, MA (US)

(72) Inventor: Simon Edelhaus, Sharon, MA (US)

(73) Assignee: EnVid Technologies LLC, Sharon, MA (US)

( * ) Notice: Subject to any disclaimer, the term of this patent is extended or adjusted under 35 U.S.C. 154(b) by 283 days.

(21) Appl. No.: 14/059,159

(22) Filed: Oct. 21, 2013

Related U.S. Application Data (60) Provisional application No. 61/720,873, filed on Oct. 31, 2012.

(51) Int. Cl.
*H04N 7/15* (2006.01)

(52) U.S. Cl.
CPC ........................................ *H04N 7/15* (2013.01)

(58) Field of Classification Search
CPC combination set(s) only.
See application file for complete search history.

(56) References Cited

U.S. PATENT DOCUMENTS

| | | | | |
|---|---|---|---|---|
| 2009/0254951 | A1* | 10/2009 | Lee et al. | H04N 5/76 725/87 |
| 2012/0027085 | A1* | 2/2012 | Amon et al. | H04N 7/15 375/240.12 |
| 2013/0204973 | A1* | 8/2013 | Yie et al. | H04N 21/2662 709/217 |

* cited by examiner

*Primary Examiner* — Joseph J Nguyen
(74) *Attorney, Agent, or Firm* — Aka Chan LLP (57) ABSTRACT

Complexity requirements of the Live Video Streaming application are addressed by introducing spatial and temporal redundancy at the stream and networking layers and combining it with advanced reconstruction techniques at the client side. A system includes: a plurality of single or multiple content sources; weighted temporal redundancy generator; a network, coupling the single or multiple content sources and weighted temporal redundancy generator, wherein the network distributes data of the sources and generator; and a plurality of single or multiple content consuming entities, coupled to the network.

16 Claims, 6 Drawing Sheets

Traditional MCU Operation

LIVE STREAMING USING MULTIPLE CONTENT STREAMS

CROSS-REFERENCE TO RELATED APPLICATIONS

This patent application claims the benefit of U.S. patent application 61/720,873, filed Oct. 31, 2012, which is incorporated by reference along with all other references cited in this application.

BACKGROUND OF THE INVENTION

The present invention relates to the field of video transmission, and more specifically to a system for live video streaming through a data or communications network to a client.

Live video streaming is a difficult technical challenge due to latency constrains, communications network bandwidth and system robustness. Such streaming gains exponential complexity once multiple points of view or channels require multiplexing. Examples are multiple Picture-in-Picture, Channel guide, and Multiuser Videoconferencing.

Low latency requirements and real-time content make the application of retransmission protocols, large jitter buffers and pause and play/buffering (trick play) techniques almost impossible. Complex communications network topology, with lack of control over intermediate nodes (e.g., the Internet), require a unidirectionally robust protocol with low latency built-in into the Client-Server (Application-Cloud) solution.

Adding to this complexity is the need to deliver multiple content streams to multiple clients with per-client stream multiplexing patterns. This typically calls for powerful video transcoding operations at the server such as, but not limited to, MCU (multiconferencing unit) in case of videoconferencing. The role of such operations is to compose a multiplexed image based on per-client requirements from the original full resolution streams arriving from multiple sources. This step allows the reduction of bandwidth and decoding requirements at the client which would otherwise be exposed to all the incoming full resolution streams.

For example, live concert streaming may present multiple camera views in the client application showing main/selected camera content in full resolution and additional cameras in low resolution preview mode for interactive selection or dynamic switching between views. Clicking on the preview channels switches to the full resolution stream from the selected source, while previous full resolution content falls back into preview mode.

Content switching may be accomplished manually, via user control, or automatically as in case of videoconferencing with multiple participants and full resolution content selection based on voice activity (e.g., active talker detection).

Another important property of live video streaming such as sporting events for example, is that interruption of the content flow has a more drastic impact on the user experience compared to loss of high resolution details. An example of this problem is a "freeze" of live streaming of a soccer match in a family living room during a critical shot, while all the neighbors are already screaming "goal!"

Therefore, what is needed is a new and improved way to deliver multiple content streams to multiple live video clients with per-client stream multiplexing patterns.

BRIEF SUMMARY OF THE INVENTION

The invention presented herein addresses the complexity requirements of the Live Video Streaming application by introducing spatial and temporal redundancy at the stream and communications networking layers and combining it with advanced reconstruction techniques at the client side.

A system includes: (I) Single or multiple content sources which may include but not limited to Broadcast Encoding Stations, content generating portion of Video Conferencing clients, Transcoding Gateways and Pre-recorded content distribution systems further referred to as SOURCE. (II) Weighted temporal redundancy generator. Weighting property is classified as the ability to provide different level of error protection for the different parts of the processed content. (III) Communications network which may include but not is not limited to, one or more of Wireline Service Provider Access Network, Wireless Service Provider Access Network, Internet Core Network, and Private and Public Network, as the means of data distribution, further referred to as NETWORK. (IV) Single or multiple content consuming entities which may include but not limited to Retransmission nodes, Transcoding Gateways, Video Conferencing Clients, Multimedia content players further referred to as CLIENT.

Other objects, features, and advantages of the present invention will become apparent upon consideration of the following detailed description and the accompanying drawings, in which like reference designations represent like features throughout the figures.

DETAILED DESCRIPTION OF THE INVENTION

Figure 1:
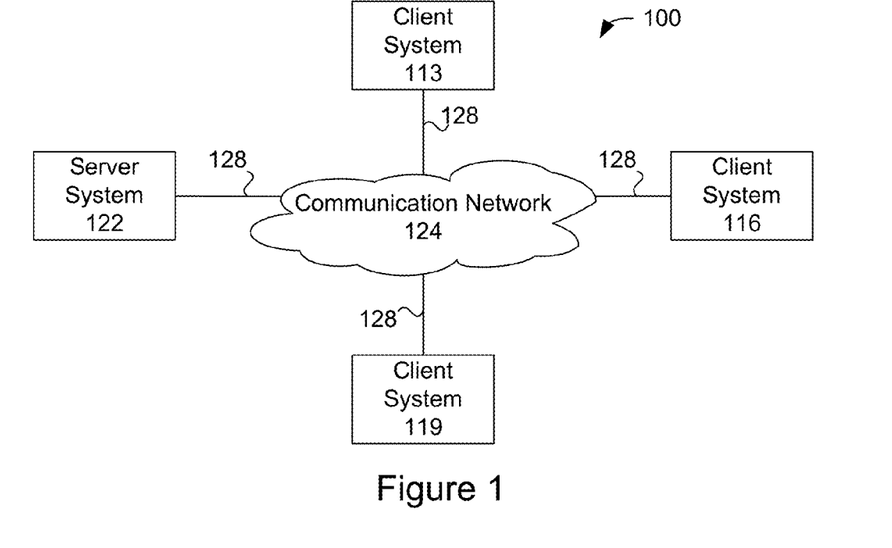
FIG. 1 shows a simplified block diagram of a distributed data or communications network.

FIG. 1 is a simplified block diagram of a distributed data or communications network 100 which embodiment of the present invention can be applied. Data or communications network 100 includes a number of client systems 113, 116, and 119, and server systems 122 coupled to a communication network 124 via a plurality of communication links 128. Data or communication network 124 provides a mechanism for allowing the various components of distributed network 100 to communicate and exchange information with each other.

Data or communication network 124 may itself be comprised of many interconnected computer systems and communication links. Communication links 128 may be DSL, Cable, Ethernet or other hardwire links, passive or active optical links, 3G, 3.5G, 4G and other mobility, satellite or other wireless communications links, wave propagation links, or any other mechanisms for communication of information. Various communication protocols may be used to facilitate communication between the various systems shown in FIG. 1. These communication protocols may include VLAN, MPLS, TCP/IP, Tunneling, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, a intranet, a private network, a public network, a switched network, and combinations of these, and the like.

Distributed communications network 100 in FIG. 1 is merely illustrative of an embodiment incorporating the present invention and does not limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server system which provides the information. For this reason, server systems typically have more computing and storage capacity than client systems. However, a particular computer system may act as both as a client or a server depending on whether the computer system is requesting or providing information. Additionally, although aspects of the invention has been described using a client-server environment, it should be apparent that the invention may also be embodied in a standalone computer system.

Server 122 is responsible for receiving information requests from client systems 113, 116, and 119, performing processing required to satisfy the requests, and for forwarding the results corresponding to the requests back to the requesting client system. The processing required to satisfy the request may be performed by server system 122 or may alternatively be delegated to other servers connected to communication network 124.

According to the teachings of the present invention, client systems 113, 116, and 119 enable users to access and query information stored by server system 122. In a specific embodiment, the client systems can run a standalone application such as a desktop application or mobile smartphone or tablet application. In another embodiment, a "web browser" application executing on a client system enables users to select, access, retrieve, or query information stored by server system 122. Examples of web browsers include the Internet Explorer browser program provided by Microsoft Corporation, Chrome browser program provided by Google Inc., Safari browser program provided by Apple Inc., and the Firefox browser provided by Mozilla, and others.

In a client-server environment, some resources (e.g., files, music, video) are stored at the client while others are stored or delivered from elsewhere in the network, such as a server, and accessible via the network (e.g., the Internet). Therefore, the user's data can be stored in the network or "cloud." For example, the user can work on documents on a client device that are stored remotely on the cloud (e.g., server). Data on the client device can be synchronized with the cloud.

Figure 2:
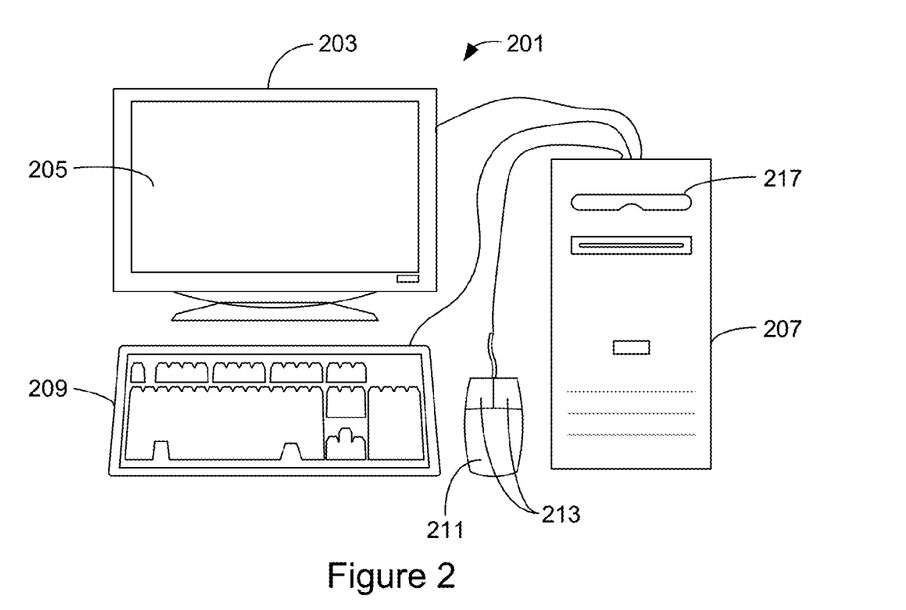
FIG. 2 shows a client or server system.

FIG. 2 shows an exemplary computer system (e.g., client or server) of the present invention. In an embodiment, a user interfaces with the system through a computer workstation system, such as shown in FIG. 2. FIG. 2 shows a computer system 201 that includes a monitor 203, screen 205, enclosure 207 (may also be referred to as a system unit, cabinet, or case), keyboard or other human input device 209, and mouse or other pointing device 211. Mouse 211 may have one or more buttons such as mouse buttons 213. It should be understood that the present invention is not limited to computer workstation systems. A user can interface with any computing device, including smartphones, personal computers, laptops, electronic tablet devices, global positioning system (GPS) receivers, portable media player, personal digital assistant (PDA), other network access devices, and other processing devices capable of receiving or transmitting data.

In a specific implementation, the client device is a smartphone or tablet device, such as the Apple iPhone (e.g., Apple iPhone 5), Apple iPad (e.g., Apple iPad, Fourth Generation, or Apple iPad mini), Samsung Galaxy product (e.g., Samsung Galaxy S3 and Samsung Galaxy Note 2), Google Nexus devices (e.g., Google Nexus 4, Google Nexus 7, and Google Nexus 10), and Microsoft devices (e.g., Microsoft Surface tablet). Typically, a smartphone includes a telephony portion (and associated radios) and a computer portion, which are accessible via a touchscreen display. There is nonvolatile memory to store data of the telephone portion (e.g., contacts and phone numbers) and the computer portion (e.g., application programs including a browser, pictures, games, videos, and music). The smartphone typically includes a camera (e.g., front facing camera and rear camera) for taking pictures and video. For example, a smartphone or tablet can be used to take live video that can be streamed to one or more other devices.

Enclosure 207 houses familiar computer components, some of which are not shown, such as a processor, memory, mass storage devices 217, and the like. Mass storage devices 217 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other nonvolatile solid-state storage (e.g., USB flash drive), battery-backed-up volatile memory, tape storage, reader, and other similar media, and combinations of these.

A computer-implemented or computer-executable version or computer program product of the invention may be embodied using, stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 217. The source code of the software of the present invention may also be stored or reside on mass storage device 217 (e.g., hard disk, magnetic disk, tape, or CD-ROM). As a further example, code of the invention may be transmitted via wires, radio waves, or through a network such as the Internet.

Figure 3:
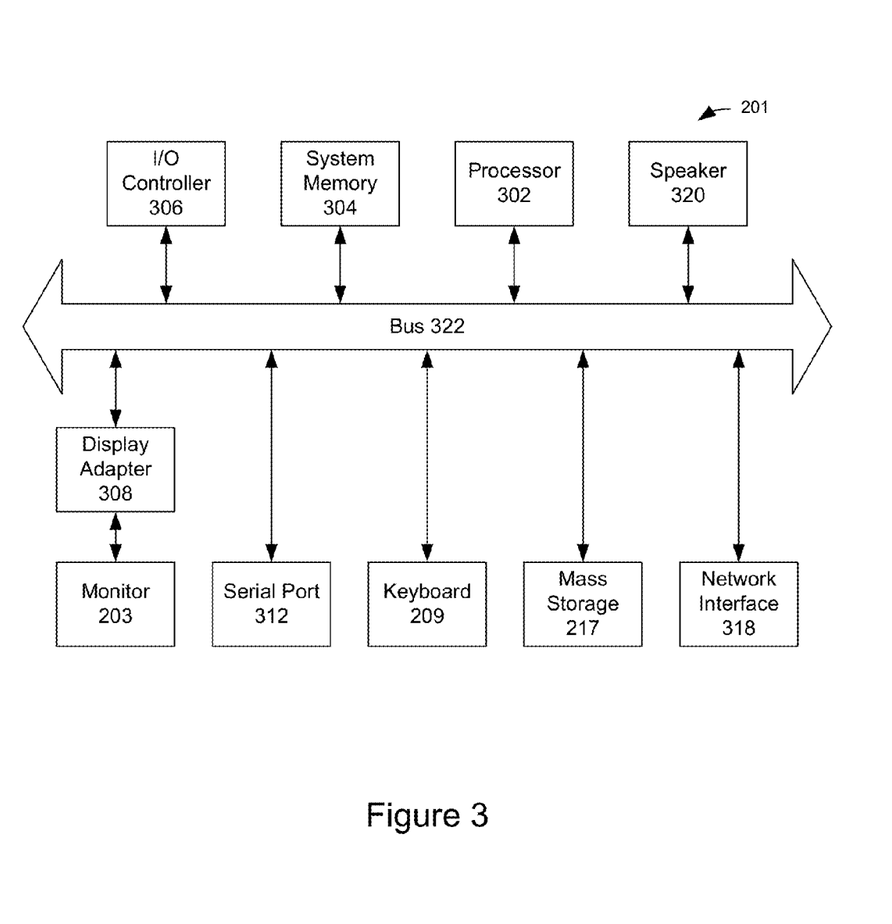
FIG. 3 shows a system block diagram of a client or server system.

FIG. 3 shows a system block diagram of computer system 201 used to execute the software of the present invention. As in FIG. 2, computer system 201 includes monitor 203, keyboard 209, and mass storage devices 217. Computer system 501 further includes subsystems such as central processor 302, system memory 304, input/output (I/O) controller 306, display adapter 308, serial or universal serial bus (USB) port 312, network interface 318, and speaker 320. The invention may also be used with computer systems with additional or fewer subsystems. For example, a computer system could include more than one processor 302 (i.e., a multiprocessor system) or a system may include a cache memory.

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. The processor may include multiple processors or a multicore processor, which may permit parallel processing of information. Computer system 201 shown in FIG. 2 is but an example of a computer system suitable for use with the present invention. Other configurations of subsystems suitable for use with the present invention will be readily apparent to one of ordinary skill in the art.

Computer software products may be written in any of various suitable programming languages, such as C, C++, C#, Pascal, Fortran, Perl, Matlab (from MathWorks, www.mathworks.com), SAS, SPSS, JavaScript, AJAX, Java, Erlang, and Ruby on Rails. The computer software product may be an independent application with data input and data display modules. Alternatively, the computer software products may be classes that may be instantiated as distributed objects. The computer software products may also be component software such as Java Beans (from Sun Microsystems) or Enterprise Java Beans (EJB from Sun Microsystems).

An operating system for the system may be one of the Microsoft Windows® family of operating systems (e.g., Windows 95, 98, Me, Windows NT, Windows 2000, Windows XP, Windows XP x64 Edition, Windows Vista, Windows 7, Windows 8, Windows CE, Windows Mobile, Windows RT), Symbian OS, Tizen, Linux, HP-UX, UNIX, Sun OS, Solaris, Mac OS X, Apple iOS, Android, Alpha OS, AIX, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11 ac, and 802.11 ad, just to name a few examples), near field communication (NFC), radio-frequency identification (RFID), mobile or cellular wireless (e.g., 2G, 3G, 4G, 3GPP LTE, WiMAX, LTE, LTE Advanced, Flash-OFDM, HIPERMAN, iBurst, EDGE Evolution, UMTS, UMTS-TDD, 1xRDD, and EV-DO). For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web. The present system is not limited to run in a web browser. In other implementations, the user accesses the system through either or both of native and nonnative applications. Native applications are locally installed on the particular computing system and are specific to the operating system or one or more hardware devices of that computing system, or a combination of these. These applications (which are sometimes also referred to as "apps") can be updated (e.g., periodically) via a direct internet upgrade patching mechanism or through an applications store (e.g., Apple iTunes and App store, Google Play store, and Windows Phone App store).

The system can run in platform-independent, nonnative applications. For example, client can access the system through a web application from one or more servers using a network connection with the server or servers and load the web application in a web browser. For example, a web application can be downloaded from an application server over the Internet by a web browser. Nonnative applications can also be obtained from other sources, such as a disk.

Figure 4:
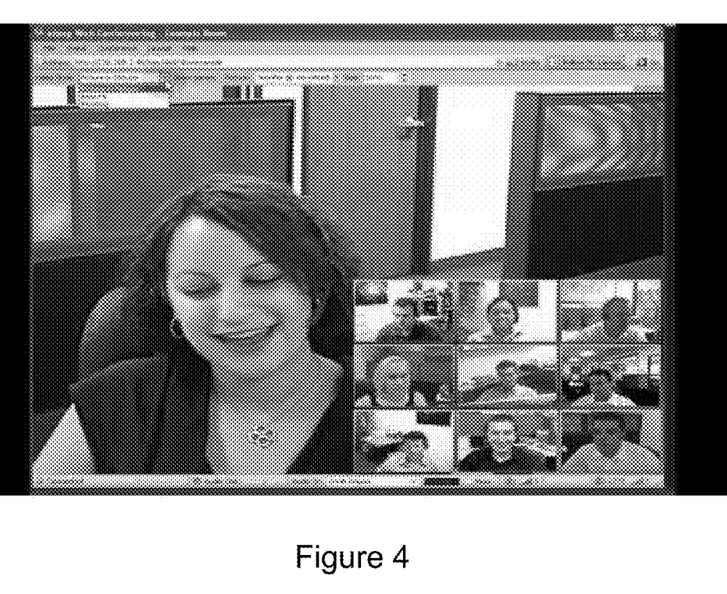
FIG. 4 shows an example of a typical live video conferencing session client screen.

FIG. 4 shows an example of a typical live video conferencing session client screen, with the main high resolution videoplane overlap with lower resolution picture-in-picture content.

Figure 5:
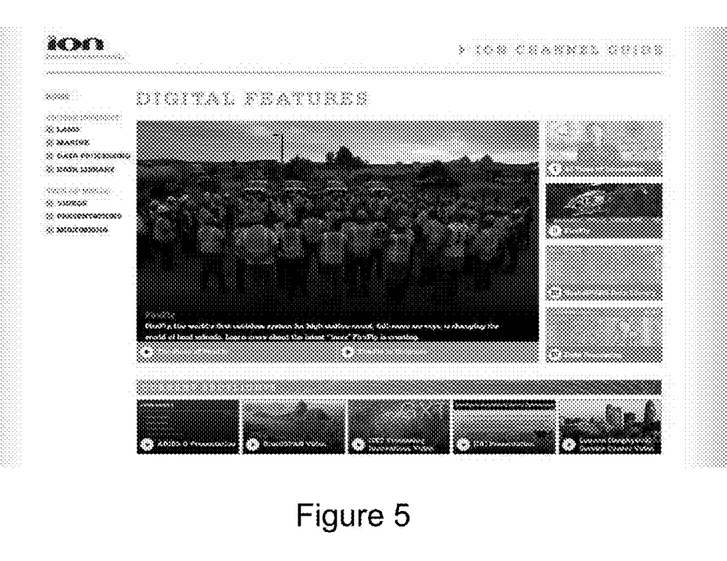
FIG. 5 shows show an example of a typical multisource live news streaming client screen.

FIG. 5 shows show an example of a typical multisource live news streaming client screen, where the main high resolution video coexists with multiple lower resolution streams.

Figure 6:
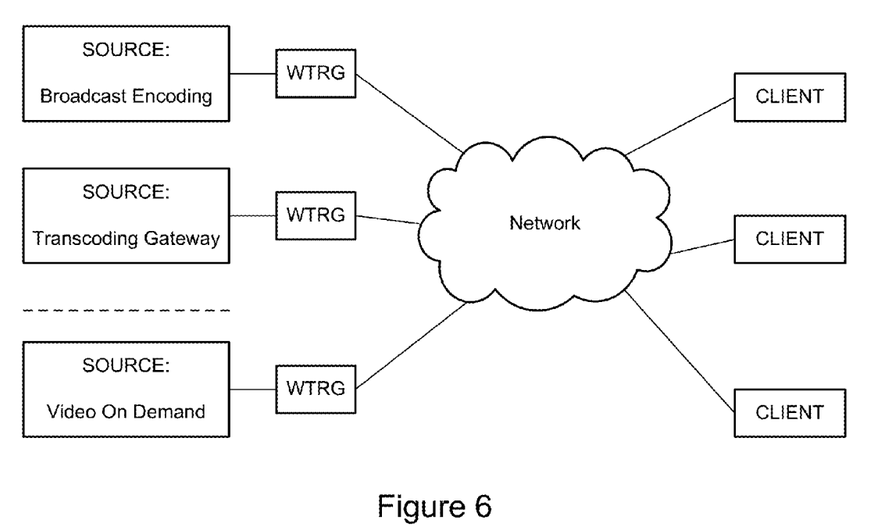
FIG. 6 shows a block diagram of the system elements and their functionality.

FIG. 6 shows a block diagram of the system elements and their functionality. The system includes single or multiple content sources, weighted temporal redundancy generator, a network, and single or multiple content consuming entities.

The single or multiple content sources can include Broadcast Encoding Stations, content generating portion of Video Conferencing clients, Transcoding Gateways and Prerecorded content distribution systems. These are indicated as "Source" in FIG. 6.

A weighted temporal redundancy generator functions to have the ability to provide different levels of error protection for the different parts of the processed content. The communications network is the means of data distribution. The single or multiple content consuming entities can include Retransmission nodes, Transcoding Gateways, Video Conferencing Clients, and Multimedia content players. These are indicated as "Client" in FIG. 6.

Operational Principles

The system includes a set of special content generation rules at the Source in combination with a weighted temporal redundancy generator.

The source generates multiple versions of the same logical content streams, where a logical relation marks the content's origin while bit-level representation is different for each version. More specifically, each version represents different resolution of the same original content starting with full detailed (highest resolution intended for distribution) stream further called HR content, and followed by one or more lower resolution streams built by encoding scaled down versions of the original content further called LR content. Multiple LR contents would represent a nested implementation. Since at any given time there are two or more copies of the same original content albeit in different resolutions, this is introducing a spatial redundancy to the system.

A Weighted Temporal Redundancy (WTR) generator injects redundancy in the temporal domain, such as a Forward Error Correction (FEC) code or a Retransmission protocol for error and packet loss protection.

HR content compared to LR content exhibits such a property that while HR content is the most desirable, it occupies the majority of the networking bandwidth and has a higher cost of error protection. Therefore, in the present invention, WTR assigns different levels of error protection to the HR content and LR content, with LR content using the strongest protection while HR content using weakest protection or no temporal protection at all.

Figure 7:
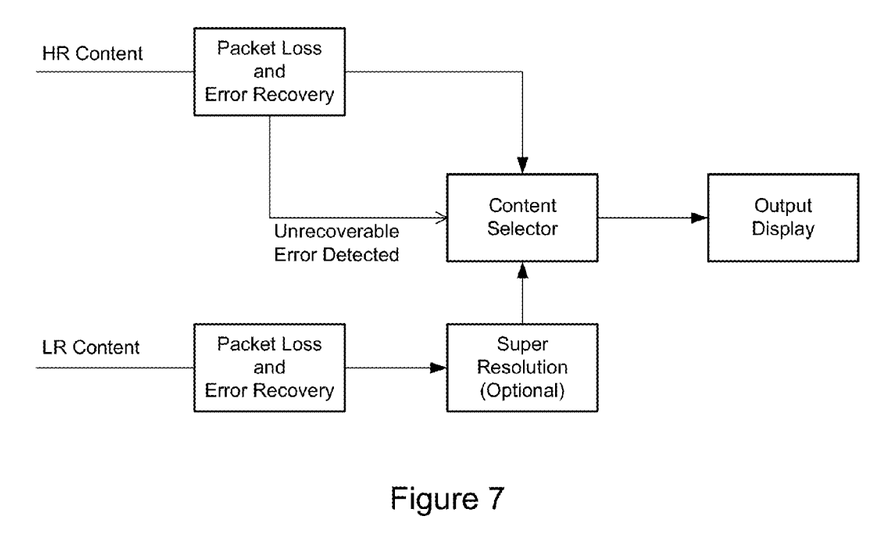
FIG. 7 shows a block diagram of the content recovery and selection by the client.

FIG. 7 shows a block diagram of content recovery and selection by the client.

Both HR content and LR content are distributed over the network following the same path of any topology (point-to-point, or star topology through server) including unicast and multicast type of transmission and arrives at the client.

The client is unique because it processes both HR content and LR content simultaneously. The client senses the stream errors and/or packet loss through means outside the scope of this invention (customary means in the art), applies error recovery based on methodology utilized by the WTR generator and flags content as erroneous or intact. An FEC based solution may encounter error rates at excess of FEC capabilities while a retransmission protocol would run out of the latency and/or bandwidth allowance. That is a tradeoff that is a function of the desired resolution.

Figure 8:
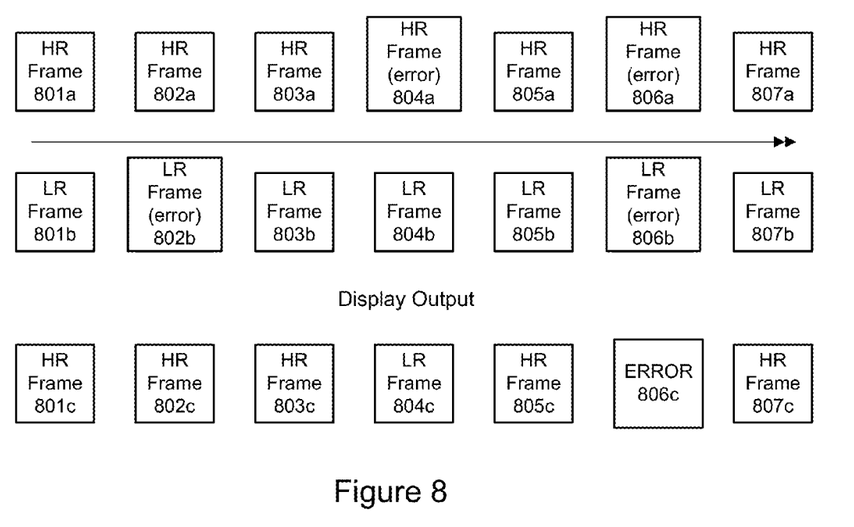
FIG. 8 shows a block diagram of a specific implementation of content reconstruction.

FIG. 8 shows a block diagram of a specific implementation of content reconstruction. There are multiple generated versions of the same logical content, where each version represents a different resolution of the original content. The highest resolution versions of the content stream, intended for distribution, is indicated in FIG. 8 as HR frame, in 801a-807a. The lower resolution versions of that same content stream, which are built by encoding scaled down versions of the original content, are indicated as LR Frame, in 801b-807b. At any given time, there are two or more versions of the same original content, albeit in different resolutions, this is introducing a spatial redundancy to the system.

The client outputs HR content as long as its path through the network and delivery is intact. In case of erroneous condition with HR content 804a and 806a, the client substitutes the portion of the content with an LR content equivalent, and output the LR content 804c. Where the LR equivalent also contains error 806b, the display output will exhibit an error 806c. Where there is no error in the HR content, the display will output the HR content 801c, 802c, 803c, 805c, and 807c. This way, the user experiences the loss of detail but not the loss of the event itself. The client falls back to traditional methods of error recovery such as content skipping in case all the source streams are exhibiting errors for overlapping segments. The probability of interruption of Live streaming content flow is minimal or zero.

Further user experience is improved by applying Super Resolution techniques to the LR content while substituting the HR content. Such techniques can include Motion Vector based SR, and reference-based SR using HR content for the reference library of high-resolution elements.

Super Resolution

In addition to classic recovery techniques mentioned, SR can be used. In classic SR, subpixel offset is controlled and instead of collecting Nx (x0, x1, . . . x(N−1)) pixels at higher resolution, one collects spatial imprints of those pixels in Nx lower resolution images (y0, y1, . . . , y(N−1)). As an example, in building a 4× resolution with 4 images, the 4 LR images have a relationship with the HR image as follows:

$$y0=(x0+x1+x2+x3)/4$$

This example shows simple averaging function of HR pixels falling into LR pixel spatial domain.

By subpixel shift, one creates y1, y2, y3 in the form of:

$$y1=(x1+x2+x3+x4)/4, yn=(xn+x(n+1)+x(n+2)+x(n+3))/4$$

This creates a system of solvable equations with 4x y's corresponding to each x. Since pixels on the edges are known, the whole model unwinds simply with linear complexity.

Reference based SR can be applied to improve LR content. With HR content available most of the time, a reference object database is built and used to replace LR objects with HR references. This method is known as "Image Hallucination," since HR references are not actual HR objects they are representing.

For reference based SR, we need to have the ability to recognize the patterns (scaled, rotated) to build a reference database.

Bandwidth Impact and Client Complexity

Image Plane processing is not required to generate video streams. Main video-plane overlap with Picture-in-Picture content, either limits the number of streams multiplexed in (such as in FIG. 4), hence there will be a minimal increase in downstream bandwidth (10-15% for 4 Picture-in-Picture streams), or requires a larger final image to fit a large amount of streams (such as in FIG. 5), and therefore doesn't provide bandwidth benefits vs. bit stream multiplexing approach.

Reduced networking protocol overhead (sync, headers are not repeated for each video stream but rather multiple video streams bundled into a single networking flow) reduces bit stream multiplexing bandwidth overhead even further.

The Client has to only marginally increase central processing unit (CPU) power for image processing and video decoding to handle multiple image streams vs. a single video stream. In the case of FIG. 5, actual processing is lower since the total amount of pixels processed is lower compare to enlarged video stream.

All within acceptable margin of existing HW/SW and Upstream Network capabilities.

Video Conferencing Application without Traditional MCU Transcoding Based on Video Stream Multiplexing This is a similar concept to Vidyo "Video Router" technology but instead, uses standard video codecs without SVC Appendix and special HW or SW codec modifications.

Figure 9:
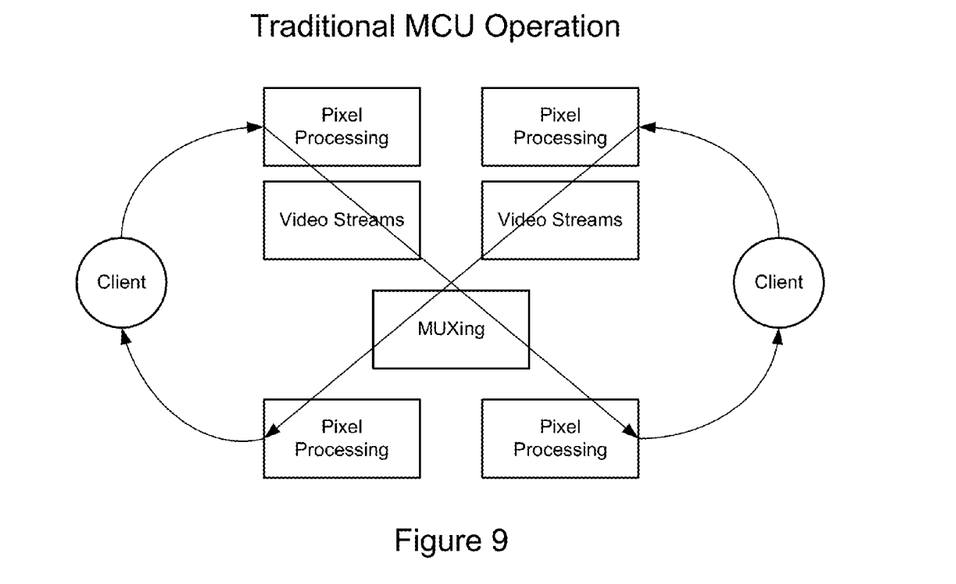
FIG. 9 shows the internal operation of a typical state of the art video conferencing MCU.
Figure 10:
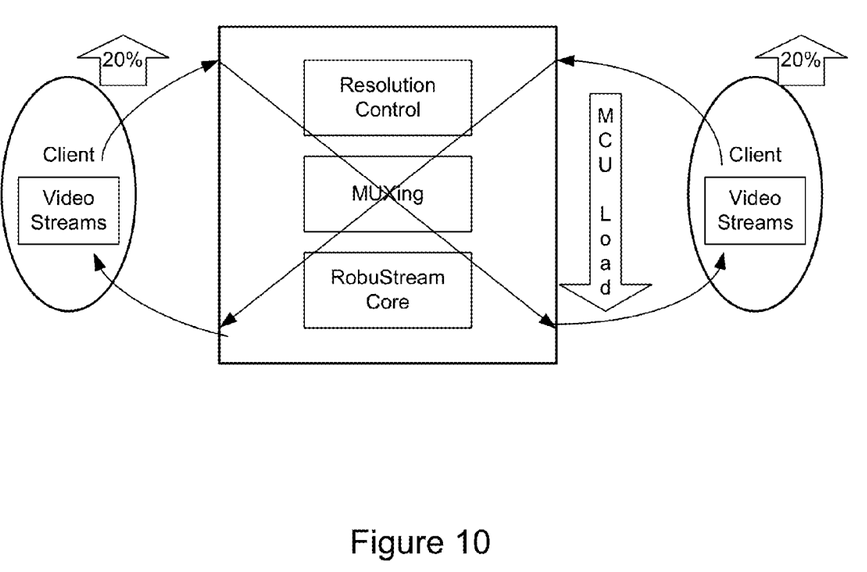
FIG. 10 shows a specific implementation of a video conferencing MCU operation

FIG. 9 shows the internal operation of a typical state of the art video conferencing MCU. FIG. 10 shows a specific implementation of a video conferencing MCU operation of the present invention. Marginal complexity increments at the client create hierarchical video streaming and drastically reduces computational load at the MCU.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A system comprising:
a plurality of single or multiple content sources;
weighted temporal redundancy generator;
a network, coupling the single or multiple content sources and weighted temporal redundancy generator, wherein the network distributes data of the sources and generator;

a plurality of single or multiple content consuming entities, coupled to the network; wherein the plurality of single or multiple content sources generate multiple versions of the same logical content-streams, where a logical relation marks the content's origin while bit-level representation is different for each version, wherein each version represents different resolution of the same original content starting with full detailed highest resolution intended for distribution stream further called high resolution (HR) content, and followed by one or more lower resolution streams built by encoding scaled down versions of the original content further called low resolution (LR) content.

2. The system of claim 1 wherein the content sources comprise at least one of Broadcast Encoding Stations, content generating portion of Video Conferencing clients, Transcoding Gateways, or Pre-recorded content distribution systems.

3. The system of claim 1 wherein a weighting property of the weighted temporal redundancy generator is classified as the ability to provide different level of error protection for the different parts of the processed content.

4. The system of claim 1 wherein the content consuming entities comprise at least one of Retransmission nodes, Transcoding Gateways, Video Conferencing Clients, or Multimedia content players.

5. The system of claim 4 wherein the content consuming entities are client-type devices.

6. The system of claim 1 wherein a nested implementation comprises multiple LR content, whereby since at any given time there are two or more copies of the same original content albeit in different resolutions, this introduces a spatial redundancy to the system.

7. The system of claim 1 wherein the weighted temporal redundancy (WTR) generator injects redundancy in the temporal domain, comprising at least one of a Forward Error Correction (FEC) code or a Retransmission protocol for error and packet loss protection.

8. The system of claim 7 wherein high resolution (HR) content is compared to low resolution (LR) content exhibits such a property that while HR content is the more desirable, it occupies the majority of the networking bandwidth and has a higher cost of error protection.

9. The system of claim 7 wherein WTR assigns different levels of error protection to the HR content and LR content, with LR content using the strongest protection while HR content using weakest protection or no temporal protection at all.

10. The system of claim 1 wherein high resolution (HR) content and low resolution (LR) content are distributed over the network using a topology including at least one of a point-to-point or star topology through a server, or unicast or multicast type of transmission, for delivery to a client device.

11. The system of claim 1 wherein the plurality of single or multiple content consuming entities processes both high resolution (HR) content and low resolution (LR) content simultaneously.

12. The system of claim 11 wherein the plurality of single or multiple content consuming entities sense stream errors or packet loss, or both, applies error recovery based on methodology utilized by the weighted temporal redundancy generator and flags content as erroneous or intact.

13. The system of claim 11 wherein the plurality of single or multiple content consuming entities output HR content as long as its path through the network and delivery is intact.

14. The system of claim 13 wherein upon the occurrence of an erroneous condition with HR content, the plurality of single or multiple content consuming entities substitute a portion of the content with a LR content equivalent.

15. The system of claim 11 comprising applying one or more Super Resolution techniques to the LR content while substituting the HR content.

16. The system of claim 15 wherein the Super Resolution techniques comprise Motion Vector based SR, Reference based SR using HR content for the reference library of high-resolution elements.

* * * * *